United States Patent [19]

Dillon et al.

[11] Patent Number: 5,066,683

[45] Date of Patent: Nov. 19, 1991

[54] MICROPOROUS WATERPROOF AND MOISTURE VAPOR PERMEABLE STRUCTURES, PROCESSES OF MANUFACTURE AND USEFUL ARTICLES THEREOF

[75] Inventors: Joseph E. Dillon; Mark E. Dillon, both of Huntington Valley, Pa.

[73] Assignee: Tetratec Corporation, Feasterville, Pa.

[21] Appl. No.: 518,435

[22] Filed: May 1, 1990

Related U.S. Application Data

[63] Continuation-in-part of Ser. No. 389, Jan. 5, 1987, Pat. No. 4,945,125.

[51] Int. Cl.$^5$ ............................................. C08J 9/40
[52] U.S. Cl. ................................... 521/54; 55/16; 55/158; 521/55; 521/134; 521/145; 521/154; 525/104; 525/903; 524/427
[58] Field of Search ..................... 55/16, 158; 521/54, 521/55, 134, 154, 145; 525/104; 524/427

[56] References Cited

U.S. PATENT DOCUMENTS

| | | |
|---|---|---|
| 3,325,434 | 6/1967 | Tully . |
| 4,187,390 | 2/1980 | Gore . |
| 4,194,041 | 3/1980 | Gore et al. . |
| 4,631,544 | 9/1986 | Burleigh . |
| 4,764,560 | 8/1988 | Mitchell . |
| 4,945,125 | 7/1990 | Dillon et al. ................... 524/427 |

*Primary Examiner*—Morton Foelak
*Attorney, Agent, or Firm*—Paul & Paul

[57] ABSTRACT

Microporous waterproof and moisture vapor permeable products are described which are formed from a matrix having an internal microstructure which is coated with a hydrophobic material. A process is described including the steps of (1) applying to the surface of the matrix a liquid hydrophobic material, (2) allowing the liquid to penetrate into the microstructure and then (3) drying, vulcanizing or curing the product.

2 Claims, 1 Drawing Sheet

MICROPOROUS WATERPROOF AND MOISTURE VAPOR PERMEABLE STRUCTURES, PROCESSES OF MANUFACTURE AND USEFUL ARTICLES THEREOF

CROSS-REFERENCE TO RELATED APPLICATIONS

This application is a continuation-in-part of our co-pending application Serial No. 000,389, filed Jan. 5, 1987, U.S. Pat. No. 4,945,125.

BACKGROUND OF THE INVENTION

1. Field of the Invention

This invention relates to improved microporous waterproof and moisture vapor permeable structures, and more particularly it relates to such structures which primarily comprise known microporous polytetrafluoroethylene (PTFE) or microporous interpenetrating matrices of PTFE and polydiorganosiloxane, and which have been treated in accordance with the process of this invention with either a curable or a non-curable hydrophobic silicone composition, or mixtures thereof, to produce microporous waterproof and moisture vapor permeable structures having improved physical characteristics and having resistance to surfactant activity.

2. Background Information

In U.S. Pat. No. 4,187,390 to Gore, there is disclosed a process of producing microporous PTFE membranes which are waterproof yet moisture vapor permeable. Such membranes are characterized by a microstructure consisting of nodes interconnected by fibrils.

In our copending application (Ser. No. 000,389 filed Jan. 5, 1987, U.S. Pat. No. 4,945,125, the disclosure of which is hereby incorporated by reference) there is disclosed a process of producing a fibrillated (having nodes interconnected by fibrils) semi-interpenetrating polymer network (SIN) of PTFE and silicone, and shaped products thereof.

In the production of microporous PTFE membranes according to the Gore ('390) process, or the production of microporous PTFE/silicone SIN membranes according to our ('389) process, linearly oriented extrudate of a biaxial fibrillation process is further biaxially oriented by use of equipment such as tenter frames or the like. The microporous membranes thus produced are then normally heated to above 327° C. and subsequently cooled to effect sintering of the PTFE, the resulting films having waterproof and moisture vapor permeable characteristics.

In U.S. Pat. No. 3,325,434 to Tully, there is disclosed an extrudable PTFE composition containing 0.6% to 12.5% by weight of uncured silicone rubber, said silicone principally serving to fill the voids created as the organic processing aid is volatilized after wire extrusion, thereby rendering a structure which has outstanding electrical properties.

In U.S. Pat. No. 4,194,041 to Gore, there is disclosed a layered article comprising a microporous membrane of PTFE having one surface in contact with a layer of hydrophilic materials so as to maintain moisture vapor diffusion while preventing contamination of the PTFE membrane from surfactants or the like. Articles produced according to this process have been found to have substantially less moisture vapor permeability in comparison to conventional microporous PTFE membranes.

In U.S. Pat. No. 4,613,544 to Burleigh, there is disclosed a unitary sheet of microporous polymeric matrix having continuous pores, said pores being sufficiently filled with a hydrophilic material so that moisture vapor is enabled to permeate the structure only by molecular diffusion.

In U.S. Pat. No. 4,500,688 to Arkles there is disclosed a melt processable pseudo-interpenetrating polymer network of silicone in thermoplastic matrices.

In U.S. Pat. No. 4,764,560 to Mitchell there is disclosed polymeric structures having interpenetrating matrices in cured form, comprising a PTFE network and a polydiorganosiloxane network.

The disclosures of each of the foregoing patents are incorporated herein by reference.

SUMMARY OF THE INVENTION

We have unexpectedly discovered that both substrates formed of microporous PTFE and those formed of microporous PTFE/silicone interpenetrating matrices having improved resistance to surfactant activity, such as conventional laundering, are produced by the process of applying to said substrates an effective amount of either a curable or non-curable hydrophobic silicone composition, or mixtures thereof, wherein the silicone composition at least partially penetrates into the pores of the microstructure, thereby coating nodes and fibriles. Upon vulcanization, curing or drying of the silicone composition, the treated substrates have been found to have superior resistance to contamination by surfactants while maintaining waterproofness and a substantially unchanged rate of moisture vapor permeability in comparison to conventional microporous PTFE membranes.

DETAILED DESCRIPTION OF THE SEVERAL EMBODIMENTS

The several embodiments of this invention are shown in the following illustrative examples.

EXAMPLE 1

The following ingredients are mixed to form a curable silicone composition:

|  | Parts by Weight |
| --- | --- |
| Vinyl N-stopped polydimethylisiloxane (3500 cps at 25° C.) | 68.2 |
| MDQ silicone resin blend | 22.7 |
| Dimethyl vinylsiloxane resin blend | 8.2 |
| bis(trimethoxysilylpropyl) maleate | 0.9 |
| Lamoreaux platinum catalyst | 10 ppm |

This silicone composition was supplied by General Electric Company as a two part system consisting of the polydimethylsiloxane, MDQ, and catalyst components as part (A) and Dimethyl vinylsiloxane, and trimethoxysilylpropyl components as part (B). The two part system was then mixed in a high sheer blender at a ratio of 10 parts (A) to 1 part (B), as taught by the manufacturer to affect the above proportions by weight.

This curable silicone composition was then blended using a liquid-solids blender as follows:
- 2955.5 grams of dispersion grade Fluon® CD123 PTFE resin
- 222.5 grams curable silicone composition
- 580.3 grams of kerosene The resultant blend was compacted into a preform, biaxially extruded through a die, linearly stretched 84 percent, transversely stretched 1278 percent in a tenter frame, and sintered at above 327° C. according to the process described in our co-pending application ('389).

Figure 1:
FIG. 1 is a scanning electron micrograph of the microstructure of conventional microporous PTFE film.
Figure 2:
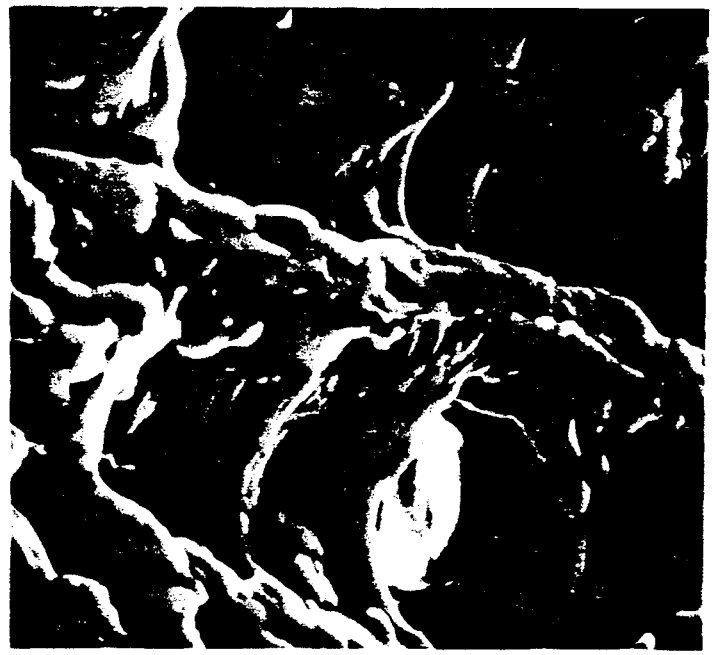
FIG. 2 is a scanning electron micrograph of the microstructure of a product produced by the process of this invention.

Five pieces of the resultant microporous film were then affixed to a flat 21"×20" chrome plated surface by means of adhesive applied around the perimeter of the material. Each piece was surface coated by spraying continuously for 15 seconds through a pressure atomizer with various kerosene mixtures of the hydrophobic curable silicone composition set forth above (2.5, 5.0, 10.0, 15.0 and 20.0 percent by weight silicone), whereupon each mixture spontaneously wicked into the microporous structure. The treated samples where then placed in an external exhaust oven and heated to 150° C. for 15 minutes to evaporate the solvent and cure the silicone elastomer. The scanning electron micrograph of FIG. 2 when compared with that of FIG. 1 shows that the nodes and fibrils of the internal microstructure of a conventional microporous PTFE membrane are partially masked with a surface coating of hydrophobic silicone composition leaving porous interstices. Table 1 shows the surprising effect on the physical characteristics of the original hydrophobic microporous film by coating the microstructure with the hydrophobic curable silicone elastomer.

EXAMPLE 2

Several samples of conventional microporous PTFE film were laminated to a woven fabric by conventional adhesive-dot bonding techniques. The curable silicone composition used in Example 1 was diluted to 11 weight percent silicone using kerosene, and the liquid applied to the film side of the laminate, whereupon it spontaneously wicked into the microporous film. The treated material was then placed in an external exhaust oven and heated to 150° C. for 15 minutes to affect curing of the hydrophobic silicone composition and volatilization of the diluent. After cooling, the dried material was determined to have 2.91 mg of silicone per square centimeter of substrate. The treated sample was then washed according to American National Standard laundry method AATCC 135-1987, and found to have passed the test by maintaining hydrostatic resistance of 50 psi after five cycles of washing. Untreated samples have consistently failed the above identified test procedure by having a hydrostatic resistance of less than 25 psi.

EXAMPLE 3

A hydrophobic non-crosslinkable (non-curable) liquid silicone composition (62 percent mineral spirits) supplied by Dow Corning under the product code C2-0563 was applied to the film side of a piece of the PTFE/fabric laminate of Example 2, whereupon the liquid composition spontaneously wicked into the microporous film, and the resultant product was allowed to thoroughly dry overnight before further analysis. The dried material was determined to have 2.71 mg of silicone per square centimeter of substrate. After washing in accordance with AATCC 135-1987, the sample was found to have maintained a hydrostatic resistance of 63 psi after five cycles of washing, thereby passing the test.

EXAMPLE 4

The curable silicone composition of Example 1, and the non-curable silicone of Example 3 were mixed with mineral spirits in the following proportions:
- 100 parts Curable Silicone Composition
- 261.99 parts Dow Corning C2-0563
- 1,638,01 parts Mineral Spirits The above proportions were chosen to affect an approximately half curable/half non-curable silicone mix in 90 weight percent mineral spirits. A piece of laminated substrate as in Examples 2 and 3 was similarly treated with the hydrophobic mixture and then placed in an external exhaust oven and heated to 150° C. for 15 minutes to affect crosslinking of the curable silicone composition and evaporation of the volatile components in situ. The sample was determined to have 1.19 mg of silicone per square centimeter of material and was found to pass AATCC test method 135-1987 with a hydrostatic resistance of 56 psi.

It is seen from Example 1 and Table 1 that a treated substrate was produced comprising a microporous polytetrafluoroethylene/silicone interpenetrating polymer network comprising a matrix in which the internal microstructure of nodes and fibrils is at least partially coated with a hydrophobic cured silicone composition. Increasing weight amounts of applied silicone compositions affected increased hydrostatic resistance while maintaining moisture vapor permeability. Optical opacity of the microporous film is decreased in direct proportion to the increase in the amount of cured silicone composition applied.

In Example 2 the treated substrate comprised conventional PTFE film which had been laminated to a breathable and non-water resistant fabric. This laminate was rendered resistant to the effects of laundering by forming a hydrophobic cured silicone composition around the PTFE microstructure of nodes and fibrils.

The benefits of the process of this invention are also observed from Example 3 where a treated substrate was produced which comprised a microporous PTFE membrane having a microstructure of nodes and fibrils which are at least partially coated with a hydrophobic non-curable silicone composition, the substrate being one layer of a laminate with a breathable and non-water resistant fabric. The resultant laminated fabric had increased resistance to surfactant activity.

In Example 4, it is shown that curable and noncurable silicone compositions may be blended to produce an effective hydrophobic coating formed in situ within the microstructure of nodes and fibrils of microporous PTFE laminated to a breathable and nonwater resistant fabric, the coating effectively increasing the resistance to surfactant activity of the laminate.

Definitions

The TAPPI opacity value is a quantification of optical opacity expressed in percentage form. Optical transparency is the mathematical compliment of opacity, and can be expressed by the equation:

% Transparency = 100 − % Opacity

Moisture vapor transmission (ASTM E96, Method B-upright) is a measurement of the moisture vapor permeability rate for a given material, and is expressed in the form of mass per area per unit time. Hydrostatic resistance is a measure of waterproofness (MIL SPEC 5512, Federal Standard 191) and is expressed as a pressure. Gurley number (ASTM D726-58 Method A) is a measurement of the air permeability of a material. The value is the amount of time in seconds that it takes a given volume of air to flow through a given area of material at a set pressure differential. The lower the Gurley number, the higher the air flow rate.

sufficient amount of a hydrophobic material so as to increase resistance to surfactant activity and wherein the hydrophobic material is selected from the group consisting of cured silicone compositions, non-cured silicone compositions and compositions resulting from the curing of a mixture of a curable silicone composition and a non-curable silicone composition.

2. A microporous film consisting essentially of a matrix of microporous biaxially fibrillated semi-interpenetrating polymer networks of polytetrafluoroethylene

TABLE 1

| Sample # | % Solution Sprayed | Amount (1) Deposited (mg/cm$^2$) | Thickness (mil) | Density (g/cc) | Hydrostatic Resistance (psi) | Moisture Vapor Transmission (g/m$^2$/24 hrs) | TAPPI Opacity (%) | Gurley Number (seconds) |
|---|---|---|---|---|---|---|---|---|
| ORIGINAL | — | — | 1.3 | 0.33 | 77 | 701 | 73.8 | 6 |
| 1 | 2.5 | 0.11 | 0.5 | 0.95 | 82 | 736 | 49.0 | 44 |
| 2 | 5 | 0.26 | 0.5 | 1.07 | 82 | 755 | 50.1 | 64 |
| 3 | 10 | 0.33 | 0.4 | 1.13 | 84 | 764 | 36.7 | 90 |
| 4 | 15 | 0.38 | 0.5 | 1.17 | 91 | 720 | 35.3 | 116 |
| 5 | 20 | 0.70 | 0.6 | 1.18 | 125 | 638 | 16.8 | 1128 |

(1) Net amount of silicone elastomer

Having thus described our invention we claim:

1. A microporous film consisting essentially of a matrix of microporous biaxially fibrillated semi-interpenetrating polymer networks of polytetrafluoroethylene and silicone, said matrix having an internal microstructure consisting of nodes interconnected by fibrils, wherein said internal microstructure is coated with a and silicone, said matrix having nodes interconnected by fibrils, wherein the internal microstructure is coated with a sufficient amount of a cured silicone composition effective to provide increased optical transparency of the film.

* * * * *

UNITED STATES PATENT AND TRADEMARK OFFICE
CERTIFICATE OF CORRECTION

PATENT NO. : 5,066,683
DATED : November 19, 1991
INVENTOR(S) : Joseph A. Dillon and Mark E. Dillon It is certified that error appears in the above-identified patent and that said Letters Patent is hereby corrected as shown below:

On the Title page, item [75], after Joseph and before Dillon
change the "E." to --A.--

Signed and Sealed this

Twenty-ninth Day of June, 1993

Attest:

MICHAEL K. KIRK

Attesting Officer      Acting Commissioner of Patents and Trademarks